Oct. 27, 1925.
L. H. ROGERS
1,558,925
THROTTLE ROD STUFFING BOX
Filed July 16, 1924
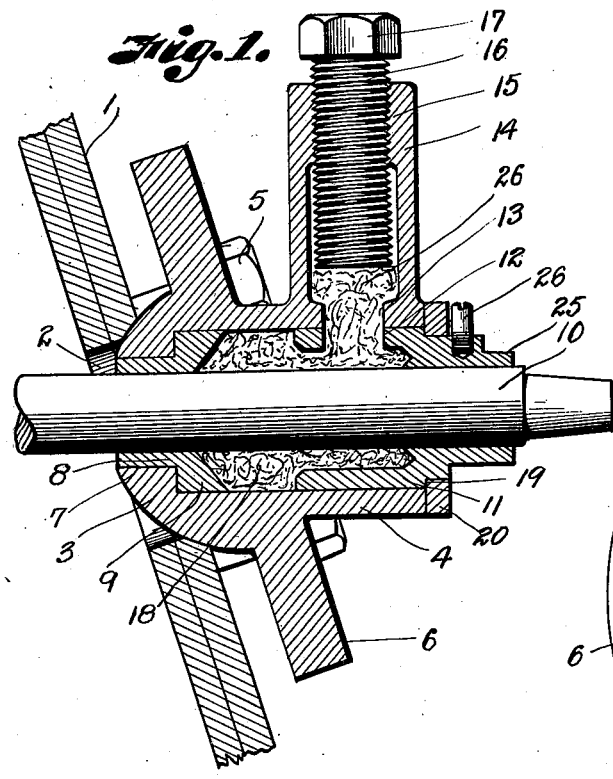
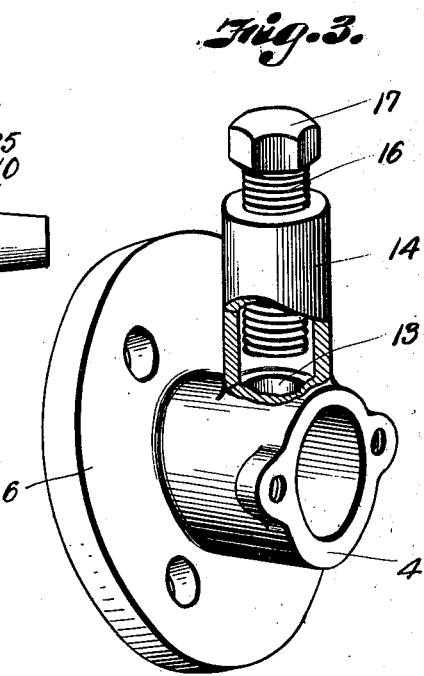
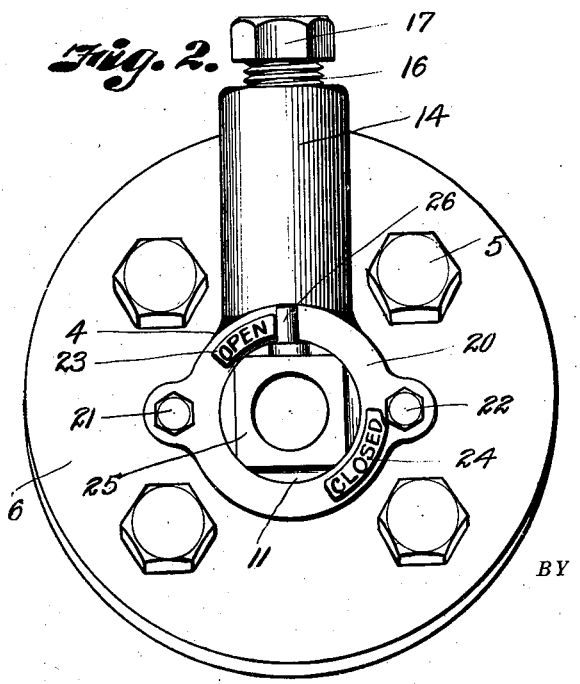
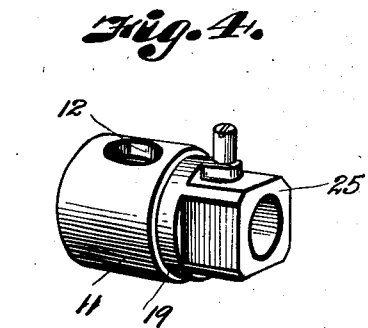
INVENTOR
Lee H. Rogers
BY Arthur C. Brown
ATTORNEY Patented Oct. 27, 1925.

1,558,925

UNITED STATES PATENT OFFICE.

LEE H. ROGERS, OF KANSAS CITY, MISSOURI, ASSIGNOR TO GUSTIN-BACON MANUFACTURING COMPANY, OF KANSAS CITY, MISSOURI, A CORPORATION OF MISSOURI.

THROTTLE-ROD STUFFING BOX.

Application filed July 16, 1924. Serial No. 726,298.

*To all whom it may concern:*

Be it known that I, LEE H. ROGERS, a citizen of the United States, residing at Kansas City, in the county of Jackson and State of Missouri, have invented certain new and useful Improvements in Throttle-Rod Stuffing Boxes; and I do declare the following to be a full, clear, and exact description of the invention, such as will enable others skilled in the art to which it appertains to make and use the same, reference being had to the accompanying drawings, and to the figures of reference marked thereon, which form a part of this specification.

This invention relates to a throttle rod stuffing box particularly adapted for use in connection with locomotive boilers.

Prior to my invention stuffing boxes have been in common use conforming generally to the construction illustrated in the patent to Daley and Long, No. 934,289, of September 14, 1909. While the stuffing box so constructed admirably served its purpose as a stuffing box, it was open to the serious objection that the pin 11 illustrated in said patent was frequently sheared off so there was no assurance that the ports 5 and 9 were in register, consequently difficulty frequently arose in packing the stuffing box. I have provided a stuffing box which eliminates this objection and which in actual practice costs less to manufacture than the stuffing boxes heretofore used.

I have also provided means for quick easy assembly and disassociation of parts and the invention consists in certain novel parts and combinations of parts, all of which will be specifically referred to hereinafter, reference being had to the accompanying drawings, in which—

Fig. 1 is a vertical, longitudinal, sectional view through a stuffing box constructed in accordance with my invention.

Fig. 2 is an end elevational view of the same.

Fig. 3 is a perspective view of the stuffing box, and

Fig. 4 is a detailed perspective view of the valve for controlling communication between the storage chamber and the stuffing box chamber.

The boiler head 1 may be part of a conventional steam boiler provided with an opening 2 to receive the rounded end 3 of the stuffing box 4, the end 3 being tightly held against the edges of the opening 2 by the stud bolts 5 which pass through the flange 6 of the stuffing box 4.

The stuffing box has a cylindrical interior with a restricted throat 7 adjacent to the boiler. The restricted throat receives the restricted end 8 of a gland or throat ring 9 which fits in the stuffing box and through which projects the throttle valve stem 10. The throttle valve stem 10 may be operated by any suitable means and it may be connected to the throttle in any appropriate manner, these connections constituting no part of my present invention.

The end of the stuffing box distant from the boiler has an opening of the same diameter as the major portion of the bore of the stuffing box and within the end is a cylindrical valve 11 open at its inner end and provided with a transverse opening 12 in its wall to register with the opening 13 which communicates the storage chamber 14 with the interior of the stuffing box.

The storage chamber may be cast integral with the stuffing box and at its upper end it is provided with an internally threaded portion 15 to receive the threads 16 of a ram in the form of a compresser screw 17 which may put the packing under compression to force it into the packing chamber 18 of the stuffing box 4.

The cylindrical valve is provided with a shoulder 19 against which may abut a plate or ring 20 fastened to the stuffing box 4 by the bolts 21 and 22. The ring or plate 20 is provided with indicia 23 to indicate when the charging chamber and the port opening 12 are in register and additional indicia 24 to indicate when they are out of register, the valve being adapted to be turned by any appropriate crank or wrench which may engage the polygonal end 25 of the valve and by reference to Figs. 1, 2 and 4, it will be observed that there is an indicator or stop pin 26 on the valve which when it is adjacent to the indicia 23 will indicate that the storage chamber may communicate with the packing chamber and which when it is adjacent to the indicia 24 will indicate that communication between the storage chamber and the packing chamber has been cut off.

When the parts are assembled with the ring plate 20 holding the valve 11 against longitudinal movement but permitting it to rotate, packing material 26 may be introduced into the storage chamber 14. The screw or ram may then force it into the packing chamber provided of course that the port 12 registers with the port 13.

If one charge of the storage chamber is insufficient to fill the packing chamber, as it will be if the storage chamber is made of less capacity than the packing chamber, the screw or ram will be removed and additional packing put in, the ram will be turned to force the packing into the packing chamber until the packing chamber becomes entirely full and adequately packed, then the valve will be turned so as to close off communication between the packing chamber and the storage chamber. The packing will now be complete but whenever the device needs repacking, it will be only necessary to turn the valve to the position shown in Fig. 1 and complete the repacking as above described.

Of course initially some packing may be put into the packing chamber before the valve is introduced and secured, but after that all of the packing will generally be fed into the packing chamber by means of the ram and I therefore consider it not inapt to designate the storage chamber as a charging chamber and the ram as a charging device.

What I claim and desire to secure by Letters-Patent is:—

1. A stuffing box comprising a housing open at both ends and having a packing feed opening in its side wall, a gland closing one end of the housing, a combination gland and cylinder valve member closing the opposite end of the housing and having an opening in its side wall registerable with the packing feed opening, and a keeper retaining the combination gland and cylinder valve member in the housing.

2. A stuffing box having a longitudinal chamber through which a throttle valve stem may pass and provided with an inlet opening in its wall at right angles to the axis of the stuffing box, a throat ring at one end of the chamber having an opening for tightly fitting the throttle valve stem, a rotary valve within the stuffing box chamber having an opening through which the throttle valve stem may pass and provided with an opening in its wall adapted to be brought into and out of register with the opening and the stuffing box, and means whereby the valve may be rotated.

In testimony whereof I affix my signature.

LEE H. ROGERS.